United States Patent [19]

Eckardt et al.

[11] Patent Number: 5,047,183
[45] Date of Patent: Sep. 10, 1991

[54] METHOD OF INJECTION MOLDING ARTICLES OF THERMOPLASTIC MATERIALS

[75] Inventors: Helmut Eckardt, Meinerzhagen; Jürgen Ehritt, Hilchenbach-Müsen, both of Fed. Rep. of Germany

[73] Assignee: Battenfeld GmbH, Meinerzhagen, Fed. Rep. of Germany

[21] Appl. No.: 255,715

[22] Filed: Oct. 7, 1988

[30] Foreign Application Priority Data

Oct. 9, 1987 [DE] Fed. Rep. of Germany ....... 3734164

[51] Int. Cl.⁵ .................... B29C 45/76; B29D 22/00
[52] U.S. Cl. ................ 264/40.3; 264/328.8; 264/328.12; 264/328.13; 264/572
[58] Field of Search ............ 264/572, 40.3, 40.1, 264/328.8, 328.12, 328.13; 425/149, 562, 568, 573

[56] References Cited

U.S. PATENT DOCUMENTS

| 3,947,177 | 3/1976 | Eckardt | 425/130 |
| 4,136,220 | 1/1979 | Olabisi | 264/572 X |
| 4,234,642 | 11/1980 | Olabisi | 264/572 X |
| 4,601,870 | 7/1986 | Sasaki | 264/572 |
| 4,685,881 | 8/1987 | Sasaki | 425/562 |
| 4,789,318 | 12/1988 | Ehritt | 425/130 |
| 4,855,094 | 8/1989 | Hendry | 264/40.3 |

FOREIGN PATENT DOCUMENTS

127961 12/1984 European Pat. Off. .
2501314 7/1976 Fed. Rep. of Germany .
3632185 3/1988 Fed. Rep. of Germany .
3632928 3/1988 Fed. Rep. of Germany .
54-123173 9/1979 Japan .................................. 264/40.3

OTHER PUBLICATIONS

English-Language Translation of Japanese Reference (Kokai) 54-123,173.

Primary Examiner—Leo B. Tentoni
Attorney, Agent, or Firm—Toren, McGeady & Associates

[57] ABSTRACT

A method and an apparatus of injection molding articles of thermoplastic material. The method includes initially forcing molten plastics material into an injection mold in an amount sufficient for forming the article. Subsequently, a flowable medium is forced into the injection mold with a pressure which distributes the plastics material uniformly over the surface of the mold cavity of the injection mold so as to form a hollow body. The hollow body is then cooled while the pressure of the medium is maintained. Finaly, the pressure of the medium is released and the molded article is removed from the injection mold. The pressure of the medium in the mold cavity is controlled and/or varied at least temporarily until the plastics material has cooled. The apparatus for carrying out the method includes a pressure reservoir for the medium which is connectible to the injection mold through lines. The lines include control and/or regulating elements.

12 Claims, 12 Drawing Sheets

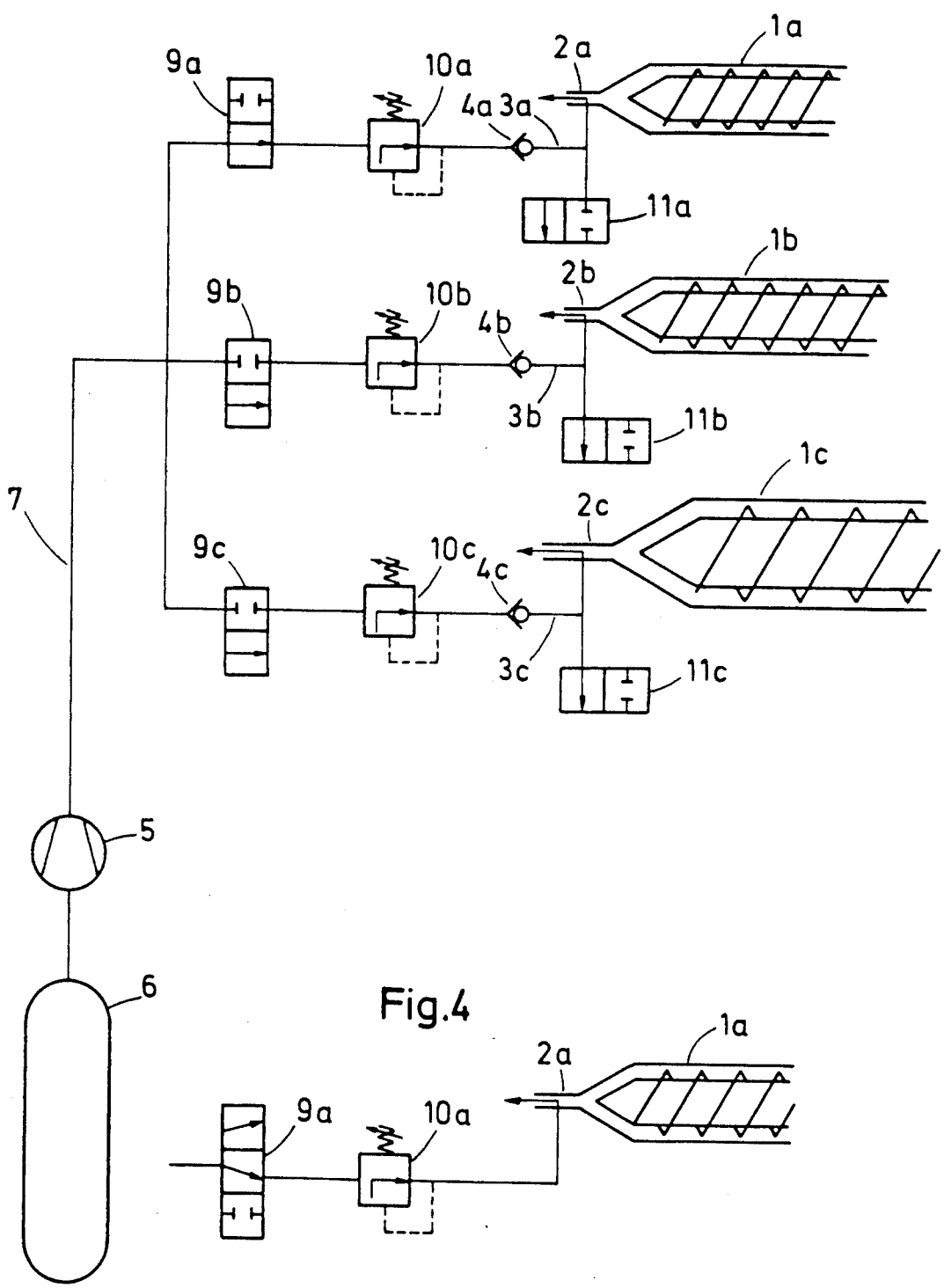

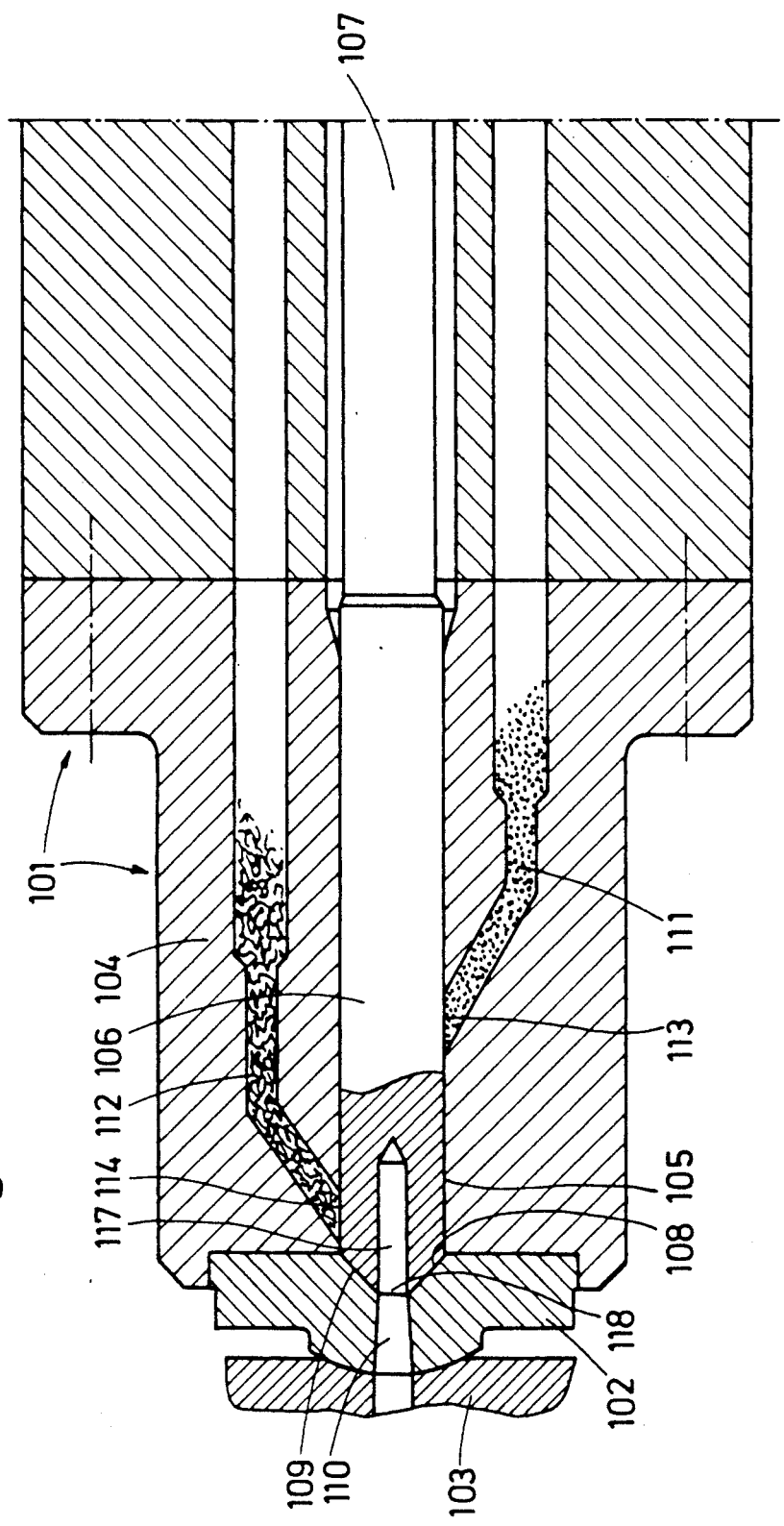
Fig. 5.1

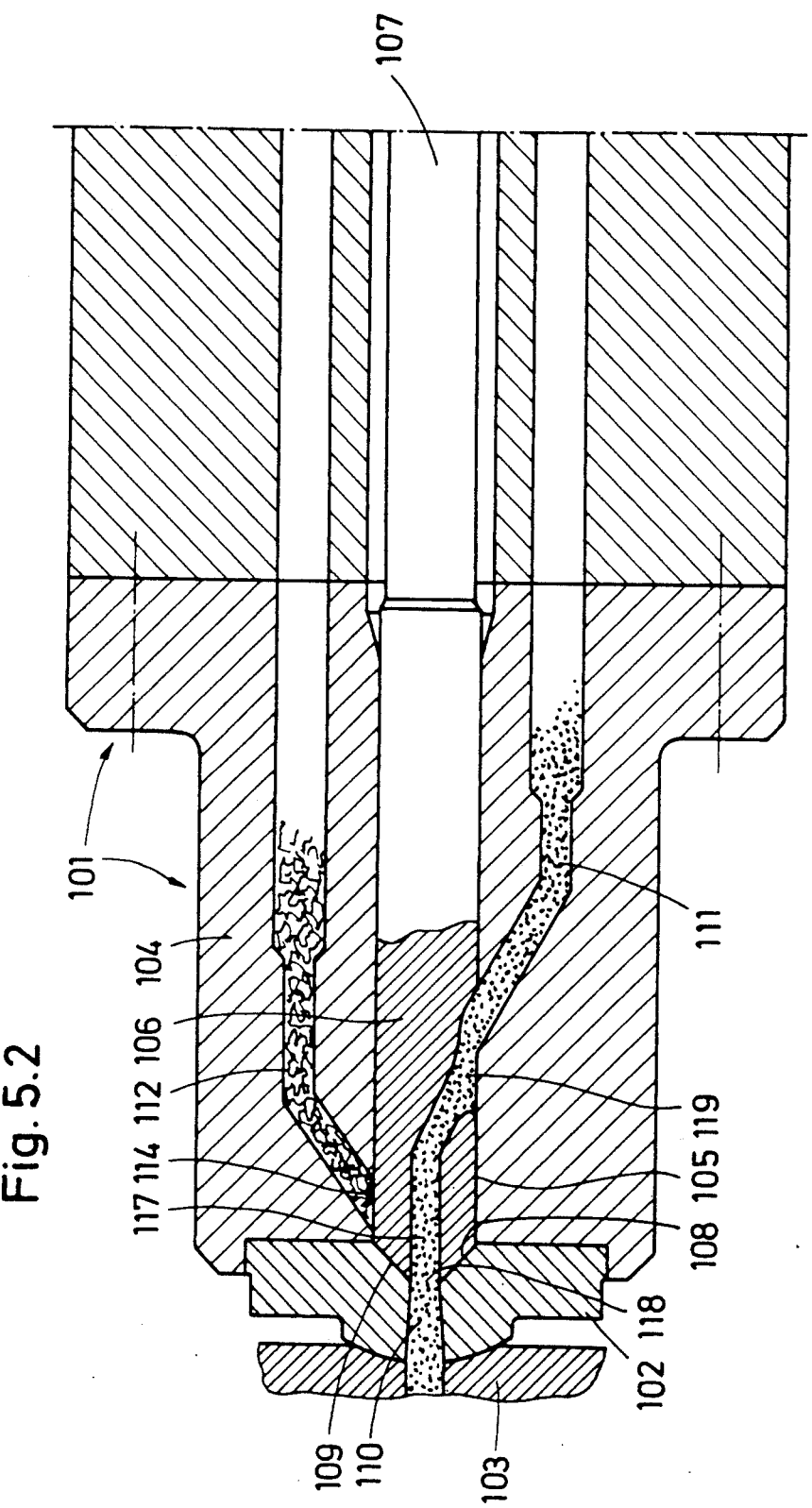
Fig. 5.2

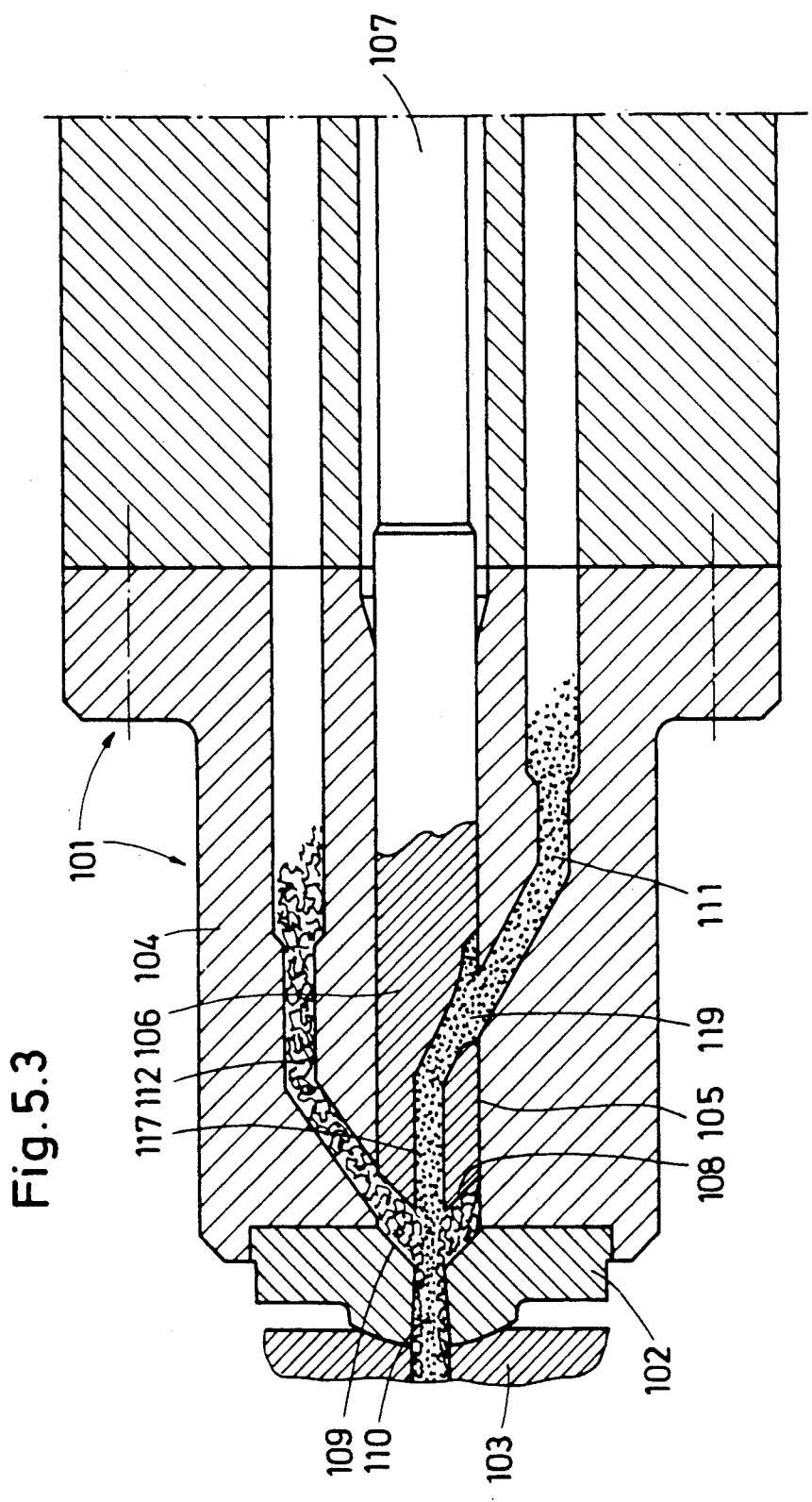
Fig. 5.3

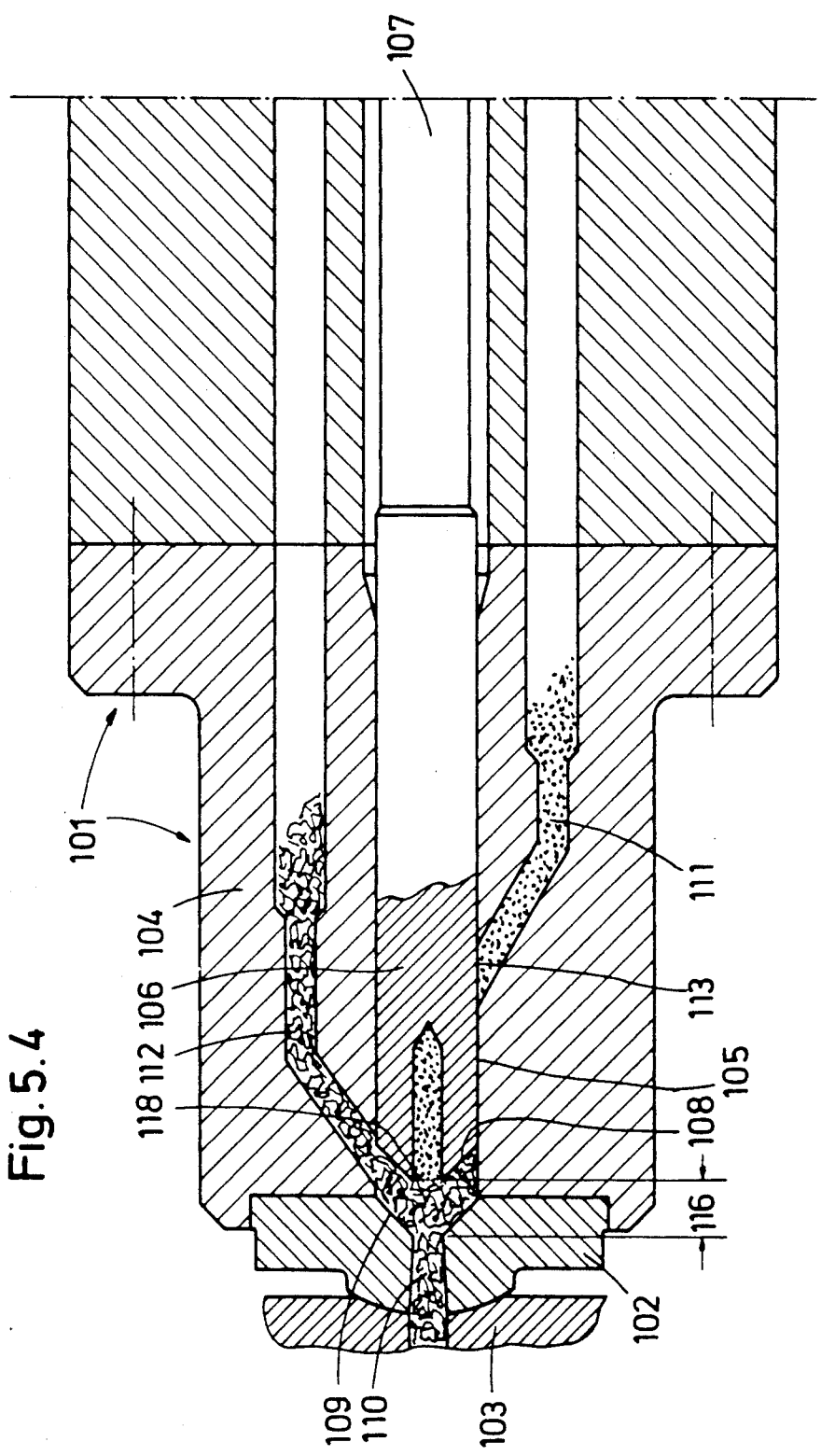
Fig. 5.4

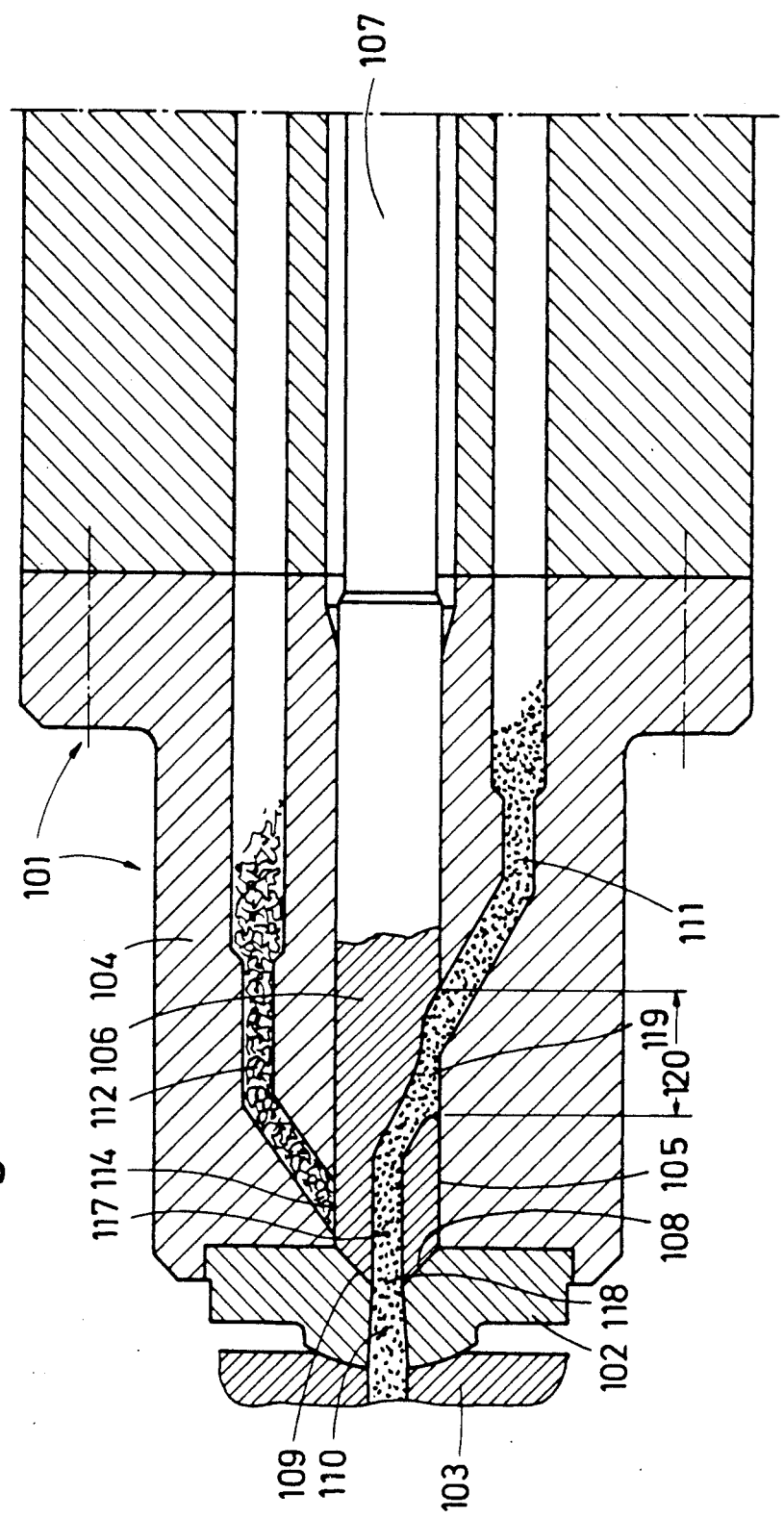
Fig. 5.5

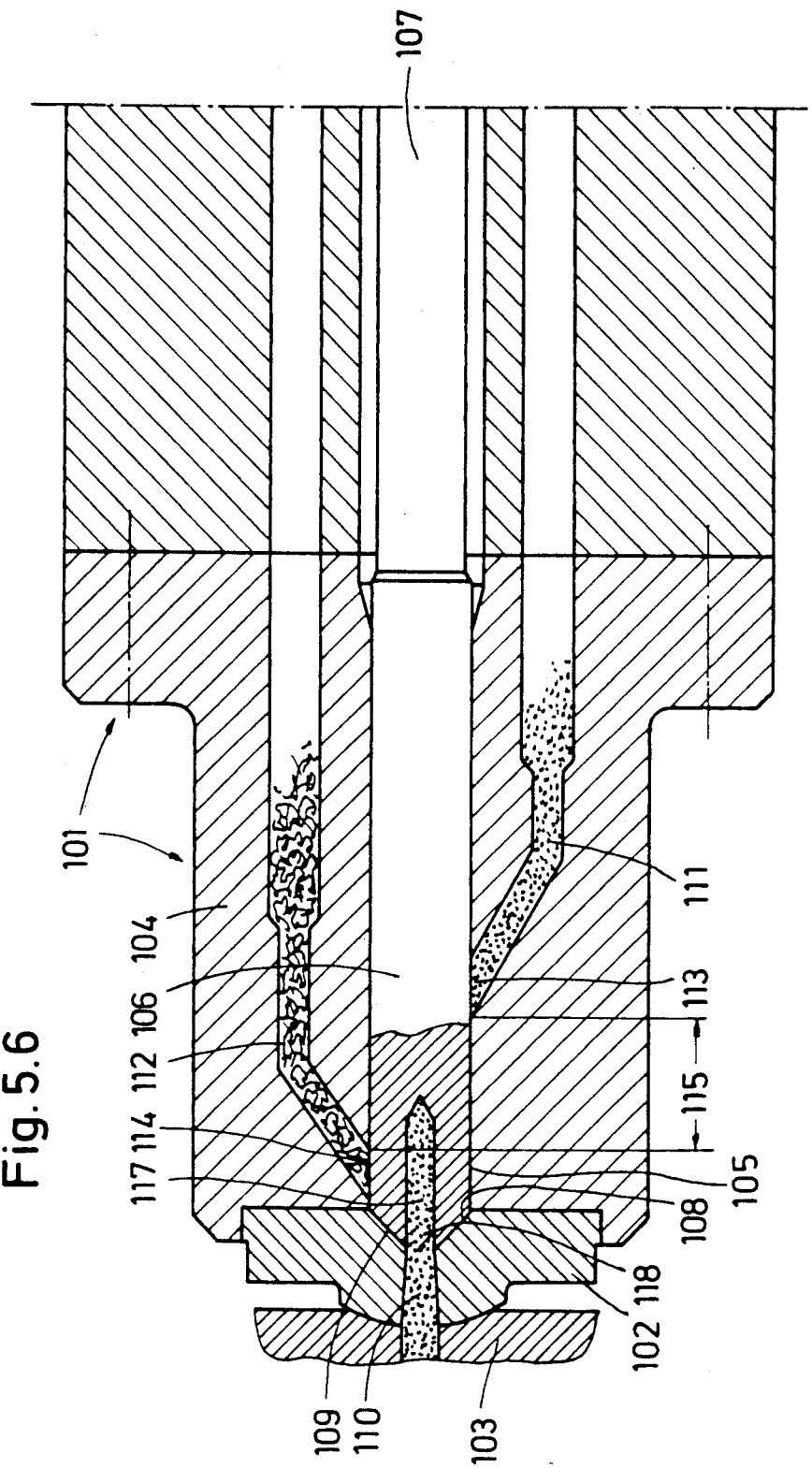
Fig.5.6

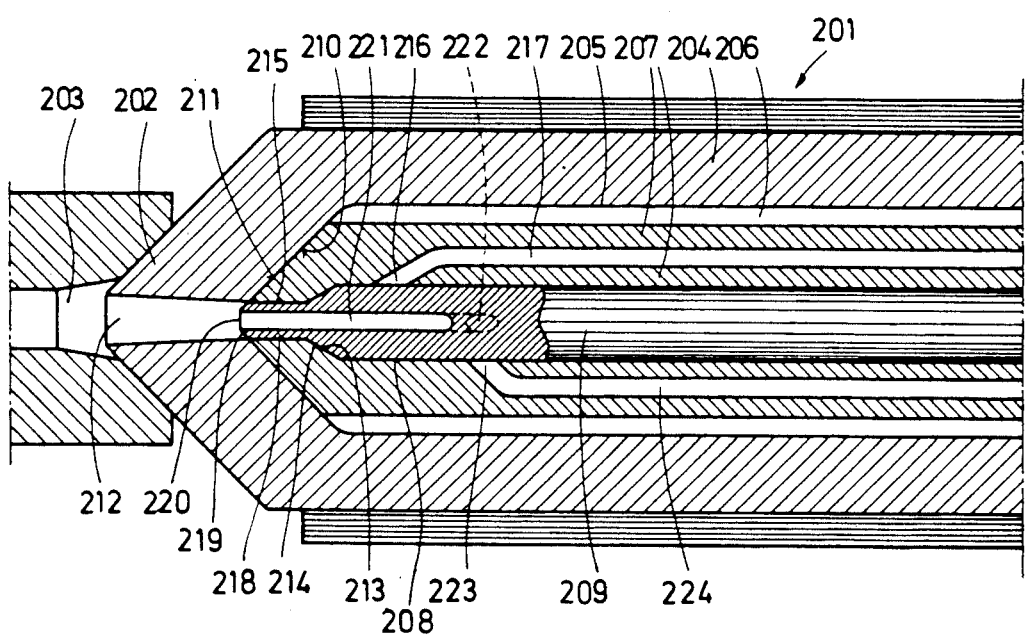
Fig. 6.1

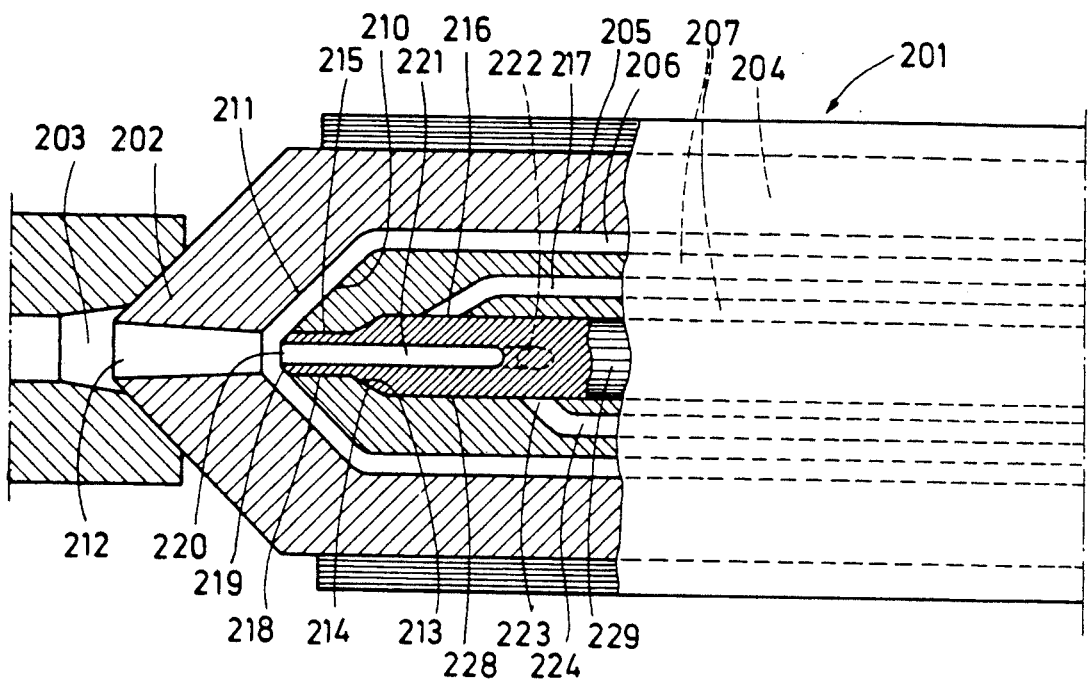
Fig. 6.2
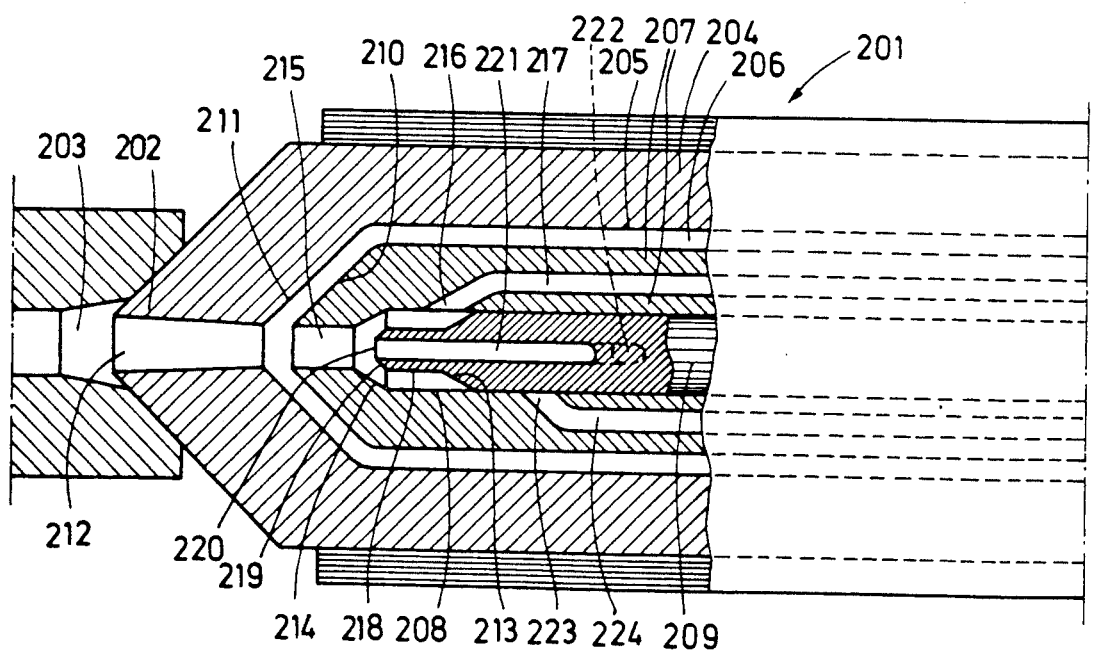
Fig. 6.3

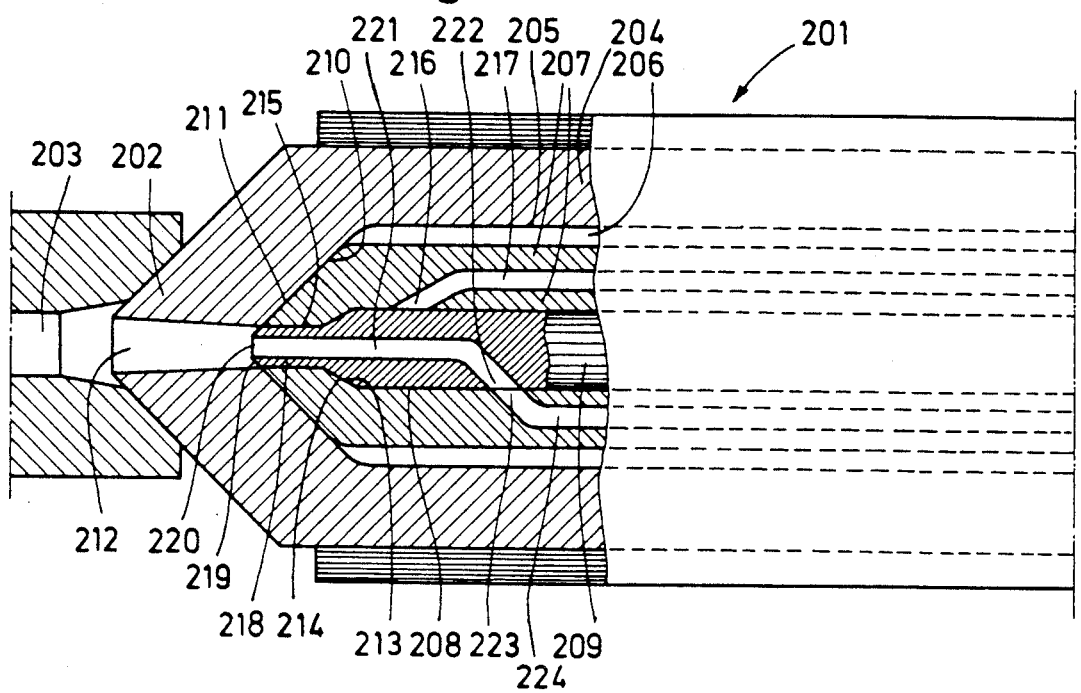
Fig. 6.4
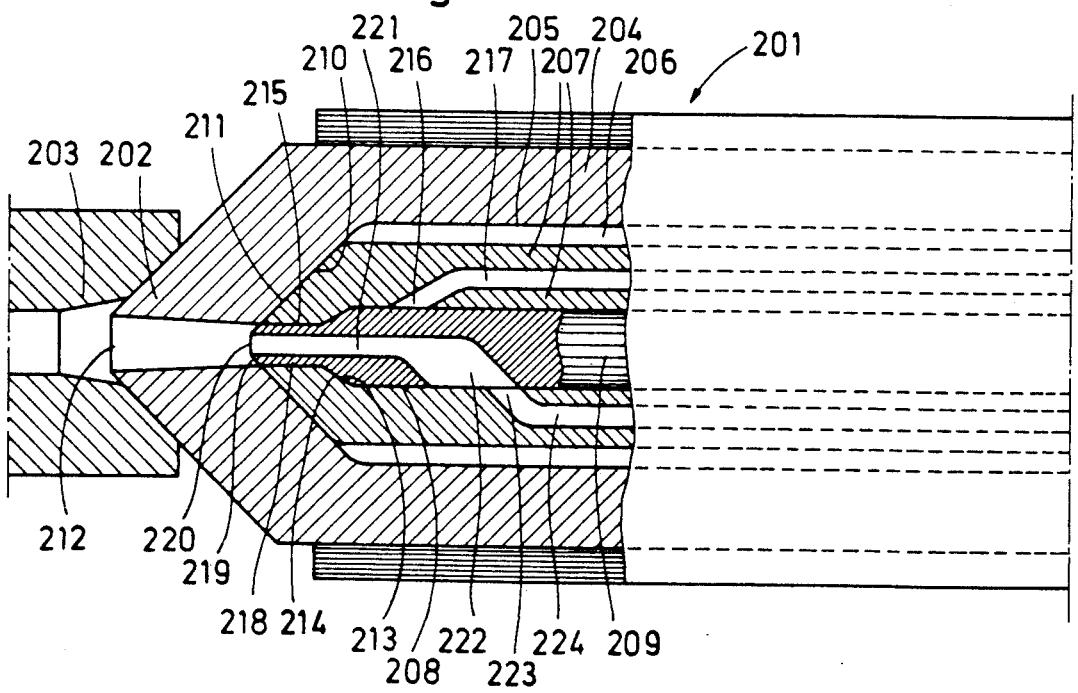
Fig. 6.5

5,047,183

METHOD OF INJECTION MOLDING ARTICLES OF THERMOPLASTIC MATERIALS

BACKGROUND OF THE INVENTION

1. Field of the Invention

The present invention relates to a method of injection molding articles of thermoplastic materials. The method includes initially forcing molten plastics material into an injection mold in an amount sufficient for forming the article. Subsequently, a flowable medium, particularly gas, is forced into the injection mold and/or the thermoplastic material with a pressure which distributes the plastics material uniformly over the surface of the mold cavity so as to form a hollow body. Further, the hollow body is cooled in the injection mold while the pressure of the medium is maintained. Finally, the pressure of the medium is released from the hollow body and the molded article is released and removed from the injection mold.

The present invention also relates to an apparatus for carrying out the method described above. The apparatus includes a pressure reservoir for the medium which can be connected to the injection mold through lines and control and/or regulating elements provided in the lines.

2. Description of the Related Art

For injection molding hollow articles of thermoplastic material, German Offenlegungsschrift No. 25 01 314 describes a method in which, immediately after injecting molten plastics material into an injection mold in an amount sufficient for forming a molded article, additionally a gas is forced in with such a pressure that the material is uniformly distributed over the surface of the mold cavity, so that a hollow body is formed which, while the gas pressure is maintained, is cooled to a temperature which is below the softening point of the plastics material.

In this known method, after forcing-in the gas, the gas inlet opening of the hollow body is closed by after-injecting a sufficient amount of molten material and is kept closed until the plastics material is cooled down below its softening point. After cooling, the gas chamber of the hollow body is opened by drilling or punching a hole in the body in order to achieve a pressure release to the atmosphere and only subsequently is the hollow body removed from the injection mold after the injection mold has been opened.

The above-described method makes it possible to influence the filling procedure of the injection mold in such a way that the hollow body is formed in the injection mold and the thermoplasticity of the plastics material is fixed in its shape by the gas pressure.

However, it has been found that, when hollow bodies of plastics material are injection molded in accordance with this known method, the structure and/or density of the walls of the hollow bodies are not always optimal, therefore, the usefulness of the finished molded articles for their purpose could be more or less diminished.

It is, therefore, the primary object of the invention to provide a method for injection molding articles of thermoplastic material and an apparatus for carrying out this method which makes it possible to influence in accordance with different environments the structure and density of the plastics material forming the walls of the molded articles while the injection procedure is carried out.

SUMMARY OF THE INVENTION

In accordance with the method of the present invention, the pressure of the medium existing within the injection mold and acting on the surface of the plastics material distributed over the surface of the mold cavity is controlled and/or varied at least temporarily until the plastics material has cooled.

The control of the pressure of the medium is important even in those cases in which the method is to be carried out at a certain pressure level, i.e., when a pressure variation is not desired or intended.

It may be advantageous and in accordance with the present invention to begin the injection procedure at a relatively low pressure of the medium, to increase the pressure subsequently and later to reduce the pressure again to a lower value, so that, for example, the end pressure approximately corresponds to the atmospheric pressure.

In accordance with an advantageous feature of the invention, the pressure of the medium is regulated and/or controlled in accordance with a pattern which is predetermined for the respective molded article and/or plastics material.

In accordance with another feature, the pressure of the medium is regulated and/or controlled in accordance with time. The regulation and/or control may also be distance-dependent. In accordance with another feature, the regulation and/or control of the pressure of the medium is time-dependent as well as distance-dependent. Finally, a temperature-dependent regulation and/or control of the pressure of the medium is also possible.

If an internal pressure sensor is provided in the mold cavity of the injection mold, the pressure of the medium can also be varied or regulated and/or controlled in dependence upon the internal pressure in the mold cavity of the injection mold.

Accordingly, the invention provides that the switch from injecting the plastics material to injecting the pressure medium can not only be carried out in a distance-dependent and time-dependent manner, but the switch can also be initiated by the hydraulic pressure of the injection molding machine or by the internal pressure in the mold cavity of the injection mold.

In accordance with another feature of the invention, the pressure of the medium can also be regulated and/or controlled so as to gradually increase and decrease. Finally, it is also possible to raise and/or lower the pressure of the medium suddenly to different pressure levels.

In all embodiments of the invention, the flowable medium, particularly the gas, which is subjected to the pressure influence, can be introduced through the extruder head or the injection nozzle of the respective injection molding machine into the injection mold for the molded article and can also be discharged therefrom.

In the apparatus for carrying out the above-described method according to the present invention which includes a pressure reservoir for the medium which is connectible to the injection mold through lines and control and/or regulating elements provided in the lines, the control and/or regulating elements are pressure valves. The control and/or regulating elements may also be pressure relief valves. In accordance with yet another feature, the control and/or regulating elements may be pressure control valves.

It may be advantageous in many instances to provide a plurality of pressure valves which are arranged parallel and which are adjustable and controllable independently of each other, but are in communication with the same mold cavity.

It is also possible to provide several groups of pressure valves connected in parallel in such a way that a single pressure reservoir for the medium is in communication with several different injection molds and/or injection molding machines.

The various features of novelty which characterize the invention are pointed out with particularity in the claims annexed to and forming a part of this disclosure. For a better understanding of the invention, its operating advantages attained by its use, reference should be had to the drawings and descriptive matter in which there are illustrated and described preferred embodiments of the invention.

BRIEF DESCRIPTION OF THE DRAWING

In the drawing:

FIG. 3 is an illustration of a control and regulating unit similar to FIG. 1, the unit being capable of simultaneous communication with several injection molding machines;

FIG. 4 is an illustration of another embodiment of the control and regulating unit similar to FIG. 3;

FIGS. 5.1 to 5.6 are longitudinal sectional views showing different positions of the extruder head of an injection molding machine used for supplying an injection mold with a plastics material component and a flowable pressure medium; and FIGS. 6.1 to 6.5 are longitudinal sectional views of the extruder head of an injection molding machine for supplying an injection mold with two plastics material components and a pressure medium.

DESCRIPTION OF THE PREFERRED EMBODIMENTS

Figure 1:
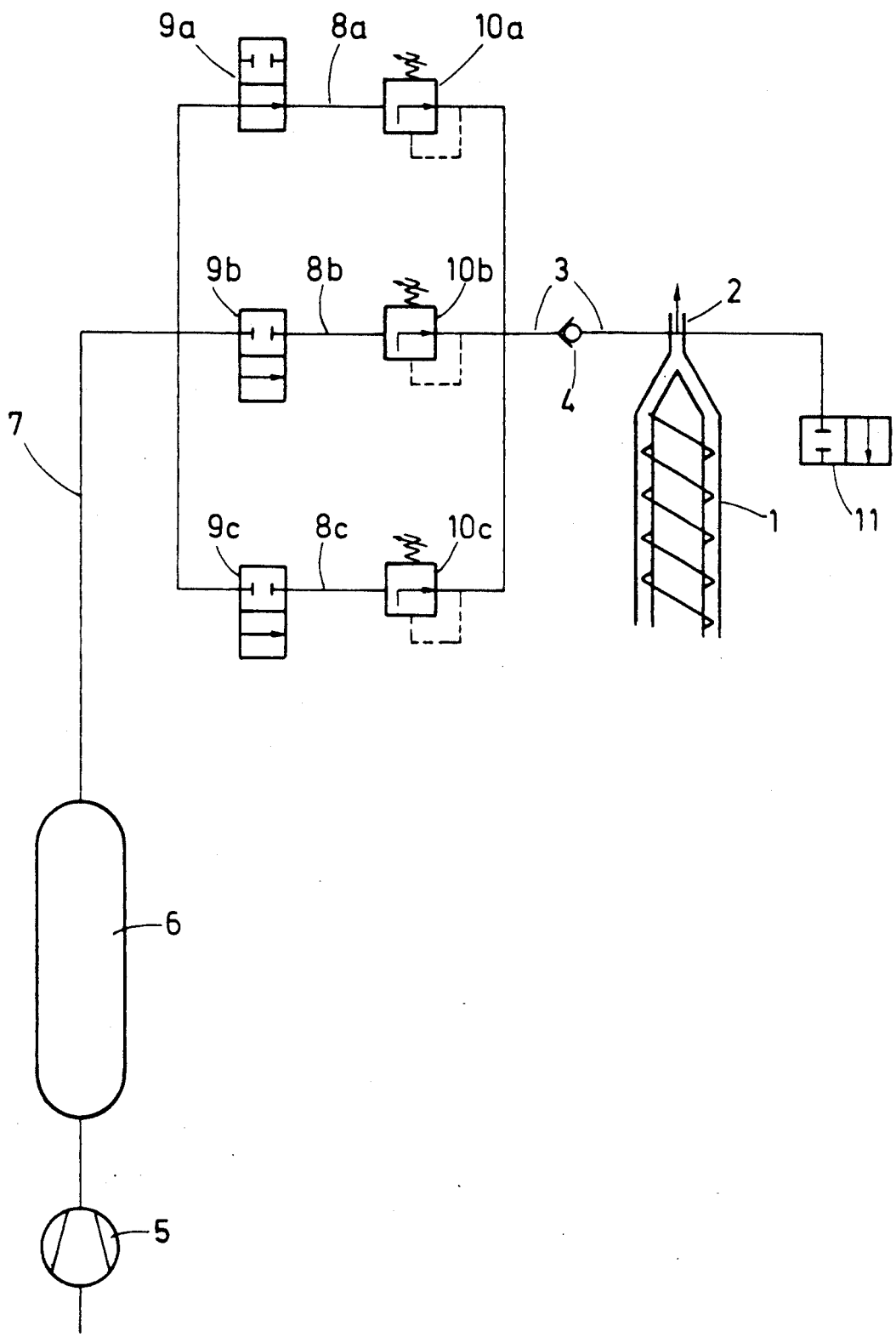
FIG. 1 is a schematic illustration of a control and regulating unit for the pressure of a flowable medium in the mold cavity of an injection mold for the manufacture of molded articles of thermoplastic material which is connected to the extruder head of an injection molding machine.

FIG. 1 of the drawing shows a screw extruder 1 of an injection molding machine. The housing of the injection molding machine has at its forward end an extruder head 2. An injection tool for the manufacture of articles of plastics material can be connected to the extruder head 2.

The plastics material which has been plasticized by means of the screw extruder 1 is forced through the extruder head 2 into the injection mold in quantities sufficient for forming the molded articles. Frequently, it is desired or even required to manufacture the molded articles as hollow bodies of thermoplastic material by distributing the thermoplastic material uniformly over the surface of the mold cavity and subsequently to cool the hollow bodies in the mold cavity. The cooled molded article is released by opening the injection mold and the article can subsequently be removed.

In order to ensure that the thermoplastic material is uniformly distributed over the surface of the mold cavity after the thermoplastic material has been introduced into the injection mold, it is necessary to additionally introduce into the mold cavity of the injection mold a flowable medium in such a quantity and under such a pressure that the complete sequence of the filling process of the mold is ensured. The flowable medium preferably is pressurized gas, for example, air, carbon dioxide or nitrogen. It is possible to introduce the flowable medium immediately after the thermoplastic material has been injected in the mold cavity. However, in accordance with a preferred feature, the final phase of the injection of the plastics material and the initial phase of the introduction of the flowable medium temporarily overlap. In this manner, it is ensured that the speed of the front of the flow of the thermoplastic material does not change and that, thus, the plastics material is transported in a problem-free and uniform manner to the surface of the mold cavity in the injection mold.

As indicated in FIG. 1, the flowable medium which is under pressure or to be pressurized, particularly a gas, is conducted through a line 3 into the extruder head 2. Line 3 preferably includes a check valve 4 which prevents the flowable medium from flowing back out of the extruder head 2.

A compressor 5 conveys the gas into a pressure reservoir 6 in such a way that the pressure in the reservoir 6 is always below a preselected minimum pressure.

Of course, instead of a pressure reservoir 6 together with a compressor 5, it is easily possible to use a pressure bottle.

The gas is fed from the pressure reservoir 6 or the pressure bottle under a given minimum pressure into a line 7 which may be connected as necessary to line 3 leading to extruder head 2 or which may be disconnected from line 3.

As shown in FIG. 1 of the drawing, line 7 can be connected to line 3 optionally over three different flow paths 8a, 8b and 8c. For this purpose, each of the three flow paths 8a to 8c includes a two-way valve 9a, 9b, 9c and, in addition, an adjustable valve 10a, 10b, 10c is provided in each flow path a to 8c behind the two-way valves 9a to 9c.

Each pressure valve 10a to 10c may be a pressure relief valve or a pressure control valve. It is advantageous to construct each of these individual pressure valves 10a to 10c so as to be selectively adjustable and to carry out the adjustment to different pressure levels by means of these pressure valves 10a to 10c. This adjustment may not only be a direct adjustment; rather, a remote adjustment is also possible.

If a remote adjustment is used, the circuit shown in FIG. 1 may be significantly simplified by employing an adjustable pressure control valve as the pressure valve. This is because in that case only a single two-way valve and also a single pressure control valve are required.

As illustrated in FIG. 1 of the drawing, the pressurized gas can be conducted from the pressure reservoir 6 from the pressure bottle to the extruder head 2 of the screw extruder and, thus, also to the injection mold connected thereto with three different pressure stages each of which is determined by its own pressure valve 10a, 10b, 10c.

As shown in the example of FIG. 1, two-way valve 9a is open while the two two-way valves 9b and 9c are closed. Accordingly, the pressurized gas is conducted through the flow path 8a and the pressure valve 10a to line 3 and by opening the check valve 4 reaches the extruder head 2 with a pressure which is determined by the adjustment of the pressure valve 10a.

It is advantageous if the remote adjustment for the two-way valves 9a, 9b and 9c is set up in such a way that always only one of the valves can be open while the two other valves are blocked in a locking position. Thus, in the case of FIG. 1, the two two-way valves 9b and 9c are in the locking position. If one of the two two-way valves which is in the locking position is to be opened, it is necessary first to place in the locking position that two-way valve which was previously in the open position, i.e., two-way valve 9a as shown in FIG. 1.

It is assumed that the pressure valve 10a is adjusted to the lowest occurring pressure level, the pressure valve 10b is adjusted for the highest occurring pressure level and the pressure valve 10c is adjusted to the middle pressure level.

It is further assumed that the two-way valves 9a, 9b and 9c are successively changed from the closed position to the open position and then again into the closed position, while the screw extruder 1 and the extruder head 2 carry out an injection operation in the molding tool, not shown, so that the following procedure takes place:

A proportioned amount of thermoplastic material is conducted from the extruder 1 through the extruder head 2 into the injection mold. By opening the two-way valve 9a, gas having the lowest pressure level acts on the plastics material and distributes the plastics material uniformly over the surface of the mold cavity in the injection mold. When the two-way valve 9a is then moved from the open position into the closed position, the gas pressure existing in the mold cavity is maintained by means of the check valve 4. When the two-way valve 9b is moved from its closed position into the open position, the highest pressure level adjusted at the pressure valve 10b becomes effective. The pressure opens the check valve 4 and becomes effective in the injection mold. The two-way valve 9b can now again be moved from its open position into its closed position, while the check valve maintains the pressure level determined by the pressure valve 10b within the mold cavity. After a certain dwell time of the highest pressure level, a two-way valve 11 which is normally in the closed position is for a short time moved into the open position, so that the highest level of the gas pressure existing in the mold cavity and the extruder head 2 is released into the atmosphere. By opening the two-way valve 9c, the gas having the middle pressure level can now be conducted through the pressure valve 10c to the extruder head 2 and the mold cavity. Since the check valve 4 now again becomes effective, the two-way valve 9c can be moved back from its open position to the closed position.

For relieving the pressure acting on the molded article forming a hollow body, it is now only necessary to move at a preselected point in time the two-way valve 11 from its locking position temporarily into its open position.

The control of the movement of the two-way valves 9a, 9b, 9c can be effected successively in a time-dependent manner, wherein each cycle begins with the injection of a predetermined amount of the thermoplastic material into the injection mold by the extruder head 2 and wherein the cycle is preselected in such a way that it ends shortly before the injection mold is opened.

The control of the movement of the two-way valve 11 can also be carried out in a time-dependent manner.

Particularly in the case of the two-way valve 11, it would also be conceivable to use a temperature-dependent control, wherein the valve is temporarily moved from its closed position into its open position when, after the two-way valve 9b has been opened, the molded article in the injection mold reaches or falls below a certain temperature.

If, contrary to FIG. 1, only one of the two-way valves 9a, 9b and 9c and only one of the subsequently connected pressure valves 10a, 10b, 10c are used, the respective pressure valve must be an adjustable pressure control valve, so that this valve, either by direct operation or remote operation, can regulate the pressure level of the gas in the extruder head 2 and in the subsequently arranged injection mold.

While the regulating procedure is carried out on the respective pressure valve 10a, 10b or 10c, the corresponding two-way valve 9a or 9b or 9c can continuously remain in its open position. However, if the pressure level of the respective pressure valve is adjusted down from a previously higher value, and if the two-way valve 11 is simultaneously opened, the two-way valve arranged in front of the pressure valve should assume its closed position in order to avoid unnecessary loss of gas. This is because the check valve 4 is ineffective in this situation.

By means of the systems described above with the aid of FIG. 1, it is possible to vary the pressure of the flowable medium, particularly a gas, within the injection mold and on the plastics material distributed over the surface of the mold cavity of the injection mold at least temporarily until the plastics material has cooled. This results in the advantage that the structure of the material and the density of the walls of the injection molded article formed as a hollow body can be optimized and, thus, the function value of the article can be increased. The quality of the molded articles of plastics material can be influenced within wide limits because the pressure of the medium cannot only be varied in dependence upon different plastics materials, but also with respect to different processing temperatures of the materials.

Figure 2:
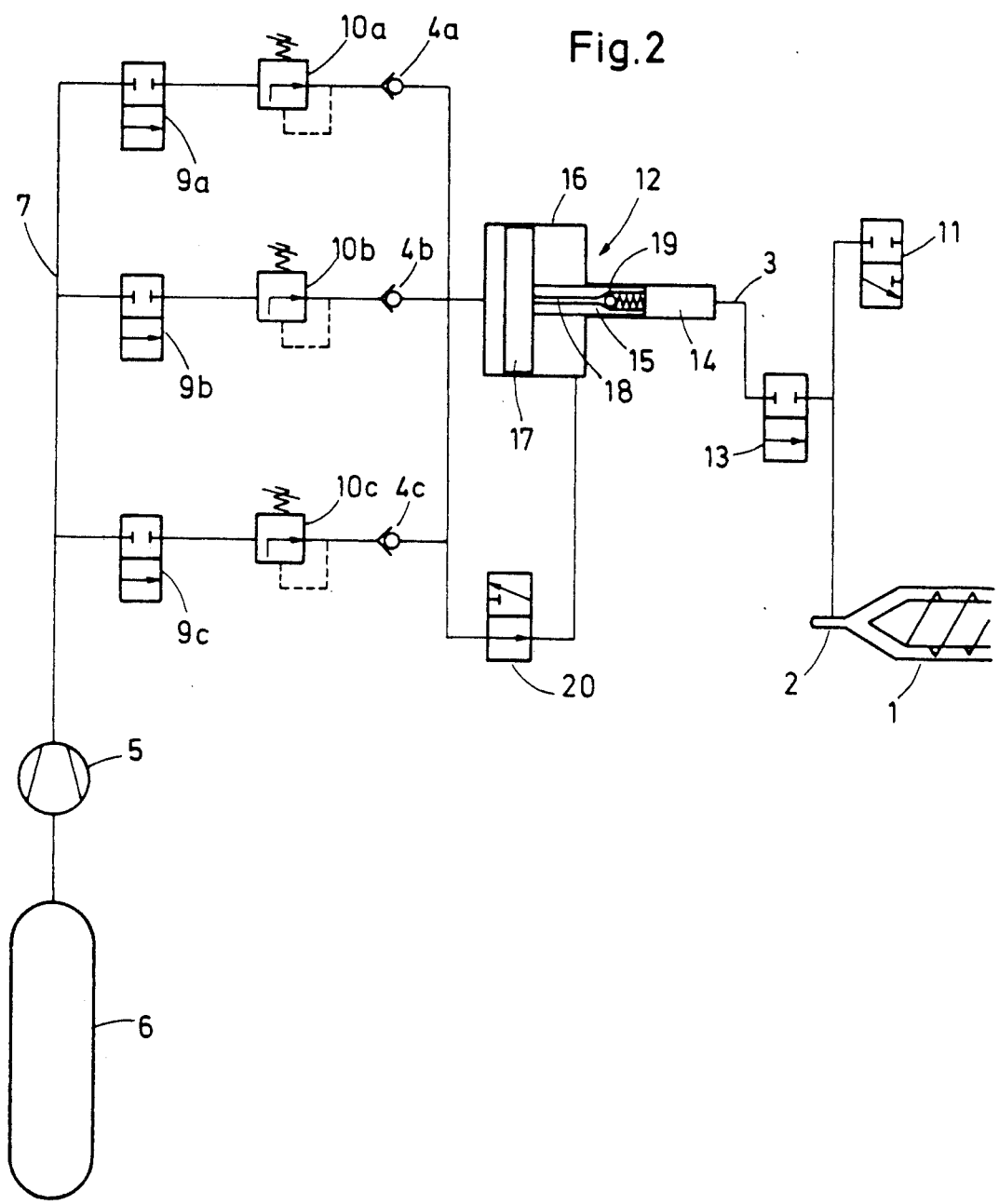
FIG. 2 is a schematic illustration of a control and regulating unit for the pressure of a flowable medium in the mold cavity of an injection mold which is additionally equipped with a proportioning device for the quantity of the flowable medium.

The regulating and control system illustrated in FIG. 2 of the drawing essentially corresponds to the system shown in FIG. 1 as far as the arrangement and manner of operation are concerned.

However, in the system of FIG. 2, an additional proportioning piston device 12 and a two-way valve 13 arranged after the proportioning piston device 12 are used.

The proportioning piston device 12 and the two-way valve 13 are provided connected in series in line 3 leading to extruder head 2.

The proportioning piston device 12 includes a proportioning cylinder 14 and a proportioning piston 15 which is axially displaceable in cylinder 14. The proportioning piston device 12 also includes an actuating cylinder 16 and an adjusting piston 17 which is axially movable in actuating cylinder 16. The actuating cylinder 16 and the adjusting piston 17 each have a cross-sectional area size which is several times greater than that of the proportioning cylinder 13 and of proportioning piston 15.

Actuating cylinder 16 and adjusting piston 17 are doubleacting, i.e., the adjusting piston 17 can be moved in the actuating cylinder 16 in both directions by applying a pressure medium on the side of the adjusting piston 17.

The side of the actuating cylinder 16 facing away from proportioning piston 15 is in communication with proportioning cylinder 14 through an axially extending duct 18 of the adjusting piston 17 and the proportioning piston 15. Axially extending duct 18 in proportioning piston 15 includes a check valve 19 which closes off duct 18 to prevent medium from flowing back from the proportioning cylinder 14.

Pressurized gas can be supplied from pressure reservoir 6 through line 7 to the cylinder space of the actuating cylinder 16 facing away from the proportioning cylinder 14 through any of the three two-way valves 9a, 9b, 9c and the corresponding pressure valve 10a, 10b, 10c and through the opened check valve 4a, 4b, 4c. The pressure level of the gas is determined by which of the pressure valves 10a, 10b, 10c is in operation.

The pressure medium can also be temporarily admitted through a two-way valve 20 to the cylinder space of the actuating cylinder 16 located closer to the proportioning cylinder 14 in order to preadjust the axial normal position of the adjusting piston 17 and the effective pressure level in the volume in the proportioning cylinder 14.

When pressure is admitted in the cylinder space in the actuating cylinder 16 and when the check valve 19 is open, the pressurized gas is conducted through the axially extending duct 18 into the proportioning cylinder 14 and fills up the proportioning cylinder 14 as long as the two-way valve 13 assumes the closed position shown in FIG. 2.

After the check valve 19 has been closed, the proportioning cylinder 14 contains a quantity of gas which is predetermined by the axial position of the proportioning piston 15. As long as the adjusting piston 17 in the actuating cylinder 16 is blocked against displacement, i.e., equal pressures exist on either side of the piston, the same pressure exists also in the proportioning cylinder 14. When the two-way valve 13 is moved from the closed position shown in FIG. 2 into the open position, the gas contained in the proportioning cylinder 14 flows into and causes a pressure increase in the extruder head and in the mold cavity of the subsequently arranged injection mold and causes the uniform distribution of the thermoplastic material of the surface of the mold cavity. As a result of the simultaneous pressure relief in the proportioning cylinder 14, the check valve 19 releases the duct 18 under the influence of the existing gas pressure, so that the proportioning cylinder 14 is again filled with gas until the preselected pressure level is arranged. When the two-way valve 20 is now switched from the position shown in FIG. 2 into its other position, the cylinder space of the actuating cylinder 16 located next to the proportioning cylinder 14 is ventilated and the gas pressure in the other cylinder space of the actuating cylinder acting on the adjusting piston 17 becomes fully effective. As a result, the adjusting piston 17 and the proportioning piston 15 are displaced and a pressure increase of the gas within the proportioning cylinder 14 occurs in accordance with the ratio of the area of the adjusting piston 17 and the area of the proportioning piston 15. The pressure increase continues through the extruder head 2 into the mold cavity of the injection mold and acts in the mold cavity on the thermoplastic material.

The pressure level increase through the proportioning piston device 12 can be varied in three different ways by means of the two-way valves 9a, 9b, 9c and the pressure valves 10a, 10b, 10c as long as the pressure valves 10a, 10b, 10c are appropriately adjusted.

In contrast to the system illustrated in FIG. 2, it is also possible in this case to utilize only one of the two-way valves 9a, 9b, 9c and only one of the corresponding pressure valves 10a, 10b, 10c if the latter is a remotely adjustable pressure control valve.

FIG. 3 of the drawing shows a control and regulating system which differs from that shown in FIG. 1 only in that the system of FIG. 3 is capable of simultaneous use with several, i.e., three screw extruders 1a, 1b, 1c and the corresponding extruder heads 2a, 2b and 2c.

In the system of FIG. 3, the two-way valve 9a and the pressure valve 10a cooperate only with the extruder 1a and its extruder head 2a. Similarly, the two-way valve 9b and the pressure valve 10b cooperate with extruder 1b and its extruder head 2b, while two-way valve 9c and pressure valve 10c cooperate with extruder 1c.

In the system of FIG. 3, the pressure valves 10a to 10c should be remotely operated pressure control valve so that it is possible to vary by means of the pressure control valves the pressure level of the gas introduced into the extruder heads 2a, 2b, 2c and the mold cavities of the injection molds connected thereto.

The pressure-controlled supply of the medium has the particular advantage that a pressure supply 5, 6 can be used without problems for several injection molding machines, wherein only one pressure valve has to be assigned to each injection molding machine which pressure valve is adjustable to the required pressure value.

In the system of FIG. 3, a pressure relief of the extruder heads 2a, 2b, 2c and the injection molds connected thereto is possible by providing a separate two-way valve 11a, 11b, 11c for each extruder 1. The two-way valves 11a, 11b, 11c operate in the same manner as the two-way valve 11 of FIG. 1.

As schematically illustrated in FIG. 4, it is possible to ventilate the extruder heads 2 or 2a to 2c and the mold cavities of the injection molding tools connected to the extruder heads without requiring the two-way valves 11 or 11a to 11c. This is because, as FIG. 4 shows, it is only necessary to replace the two-way valves 9a, 9b, 9c with three/two-way valves which can be switched to an additional ventilating position.

All the control and regulating systems illustrated in FIGS. 1 to 4 of the drawing and described above have the advantage that the pressure of the flowable medium, i.e., particularly a gas, can be regulated and/or controlled in accordance with a predetermined pattern for each molded article and/or plastics material.

The areas control and/or regulating systems can be influenced as desired. In addition to a time-dependent influencing, it is also possible to use a distance-dependent influencing and possibly a temperature-dependent influencing. It would even be conceivable to combine all types of influencing with each other or possibly to provide a program control.

When the pressure valves are preadjustable pressure relief valves, the gas pressure can be changed suddenly and abruptly by opening and closing the two-way valves arranged in front of the pressure relief valves. On the other hand, if the pressure valves are pressure control valves, it is easily possible to regulate and/or control the gas pressures in such a way that the gas pressure increases and decreases gradually.

In the molded articles of plastics material manufactured in the above-described manner, the sprue region has an opening leading from the interior to the outside. This opening is required for introducing and releasing the pressure gas.

This opening of the molded article can be closed in a certain manner before the article is removed from the mold if the pressure gas is introduced and released through the extruder head 2.

If immediately after venting the molded article, the orifice of the extruder is once again opened and an exactly predetermined amount of thermoplastic material is extruded, the opening existing in the hollow article is sealed as a result.

The additional amount of thermoplastic material referred to above can be extruded in different manners. For example, it is possible, when the thermoplastic material is injected into the injection mold, that the screw piston is not fully moved against the front stop and, thus, a small quantity of plasticized material remains for the after-injection procedure. It is also possible to plasticize a small quantity of plastics material during the time the gas acts on the mold cavity of the injection mold and to inject this small quantity of material afterwards into the opening. Finally, it would also be conceivable to introduce a certain amount of plasticized material into the opening by a subsequent rotation of the extruder screw.

In any event, any of the above-described procedures result in a hollow molded article which is liquid-tight.

The above described method does not only make it possible to manufacture hollow molded articles by injection molding of thermoplastic materials which consist of a single plastics material component, but the methods can also be used when two or more plastics material components must be employed.

For carrying out a method of injection molding hollow molded articles in which only a single plastics material component is to be introduced into the mold cavity of the injection mold and the plastics material is then to be subjected to the pressure of a flowable medium, especially a gas, an extruder head as described in German patent application No. P 36 32 185.0 is particularly suitable. On the other hand, it is advantageous to use an extruder head described in German patent application No. P 36 32 928.2 if hollow molded articles are to be injection molded from two plastics material components which are to be subjected to the pressure of a flowable medium during the injection procedure.

While the first-mentioned type of extruder head is illustrated in FIGS. 5.1 to 5.6 of the drawing, the secondmentioned type is illustrated in FIGS. 6.1 to 6.5 of the drawing.

FIGS. 5.1 to 5.6 each are longitudinal sections showing the essential portion of an extruder head 101 in different positions of operation. A nozzle 102 of the extruder head 101 rests against a sprue bushing 103 of an injection mold, not illustrated.

A main duct 105 which receives a closing needle 106 extends from nozzle 102 coaxially through a housing 104 of the extruder head 101. The closing needle 106 has a shaft 107 which extends toward the rear through the extruder head 101. A displacement drive, not shown, actuated by means of a pressure medium, particularly hydraulically, acts on the shaft 107.

The other end of the closing needle 106 has a sealing cone 108 which interacts with a correspondingly shaped sealing cone 109 in the nozzle 102 when the closing needle 106 is in the forwardly moved closing position, as can be clearly seen in FIGS. 5.1, 5.2, 5.5 and 5.6.

At a greater distance from nozzle 102 having an orifice 110, a supply duct 111 opens into the main duct 105 of the housing 104 at a predetermined angle, for example, 30° to 40°.

At a smaller distance from the nozzle 102, another supply duct 112 opens into the main duct 105 of housing 104 also at a predetermined angle, for example, 30° to 40°.

Openings 113 and 114 of the two supply ducts 111 and 112 into the main duct 105 are preferably provided at two oppositely located circumferential regions of the main duct 105 and are axially spaced from each other by a distance 115. Distance 115 preferably is about twice the axial distance between the two openings 113 and 114 of the supply ducts 111 and 112.

The length 116 indicated in FIG. 5.4 of the maximum axial displacement of the closing needle 106 is to be selected at least such that the cross-section of the opening 114 of the supply duct 112 in the main duct 105 can be completely closed, as shown in FIGS. 5.1, 5.2 and 5.5, 5.6, and can be almost completely released, as shown in FIGS. 5.3 and 5.4.

The closing needle 106 has a connecting duct 117 extending coaxially with the longitudinal axis. The connecting duct 117 includes an opening 118 at the free end of the closing needle 106. Opening 118 is located in axial alignment with the orifice 110 of the nozzle 102. The other end of the connecting duct leads radially toward the periphery of the closing needle 106 at a predetermined angle of inclination, for example, 30° to 40°. Connecting duct 117 ends at the periphery of the closing needle 106 in an opening 119 which has an axial width 120, as shown in FIG. 5.5, which is greater than the axial width of the opening 113 at the corresponding supply duct 111. It has been found useful to dimension the axial width 120 of the opening 119 approximately such that it is approximately twice as large as the axial width of the opening 113 of supply duct 111. This makes it possible to maintain a flow connection between the supply duct 111 and the connecting duct 117 even when the closing needle 106 is axially displaced, as can be seen from a comparison between FIGS. 5.2 and 5.4 of the drawing.

On the other hand, to ensure that the flow connection between the supply duct 111 and the connecting duct 117 can be interrupted at any time, the closing needle 106 is not only axially displaceable but also rotatable within the main duct 105 in the housing 104 of the extruder head 101. The angle of rotation of the closing needle 106 can be limited in such a way that the opening 119 of the connecting duct 117 can be connected from the opening 113 of the connecting duct 111, shown in FIGS. 5.1, 5.4 and 5.6, while the connection between openings 119 and 113 is also possible as shown in FIGS. 5.2, 5.3 and 5.5.

An angle of rotation of, for example, 90° is sufficient in most cases for effecting and interrupting the flow connection of the supply duct 111 with the connecting duct 117.

In the simplest case, the axial displacement and the rotation of the closing needle 106 are effected and controlled independently from each other through separate drives. In this situation, it is possible to carry out the translatory and the rotary motion of the closing needle 106 as desired either simultaneously or staggered with respect to time.

However, it is also easily possible to couple the translatory and rotary motions of the closing needle 106 and, thus, to control the motions in predetermined relationships with each other. For this purpose, cam drives or sliding block-type drives can be used. These drives can be adjusted easily to different requirements.

On the other hand, it would also be possible to mount the closing needle 106 in the housing 104 of the extruder head 101 so as to be only axially displaceable and to surround the closing needle 106 with a sleeve which is rotatable but axially immovably mounted in housing 104 of the extruder head 101. This sleeve would have the opening 119 with the axial width 120 which, depending on its position of rotation, effects or disconnects the flow connection between the supply duct 111 and the connecting duct 117.

In the extruder head 101 illustrated in the drawing, supply duct 111 in housing 104 together with the connecting duct 117 in closing needle 106 serve for supplying the flowable medium, particularly a pressure gas, while the plastics material melt is supplied to main duct 105 through supply duct 112.

In the position of operation of the extruder head 101 shown in FIG. 5.1, i.e., in the closed position of the closing needle 106, the flow of melt is conducted through the supply duct 112 only up to the periphery of the closing needle 106. Thus, the melt cannot reach the main duct 105 and the nozzle 102.

In the position of operation shown in FIG. 5.2, the closing needle 106 is still in the closing position. However, the needle 106 has been turned in circumferential direction in such a way that the outlet opening 113 of the supply duct 111 is in communication with the opening 119 of the connecting duct 117 in the closing needle 106. Thus, the flowable medium conducted through the supply duct 111 can reach the injection mold through connecting duct 117 and the orifice 110 of the nozzle 102.

In the position illustrated in FIG. 5.3, the opening 114 of supply duct 112 into the main duct 105 is released and opening 118 of connecting duct 117 is simultaneously retracted from the orifice 110 of the nozzle 112 within the main duct 105. In this position, the simultaneous supply of thermoplastic material and of flowable medium is possible through the main duct 105 into the orifice 110 of the nozzle 102.

When the closing needle 106 is rotated about its longitudinal axis from the position shown in FIG. 5.3 into its basic position, so that the outlet opening 113 of the supply duct 111 is disconnected from the opening 119 of the connecting duct 117, the supply of the flowable medium can be interrupted.

As soon as the desired or required amount of plastics material has reached the injection mold, the closing needle 106 is rotated from the position shown in FIG. 5.4 and is also axially displaced, so that initially the position of operation shown in FIG. 5.3 and then the position shown in FIG. 5.5 is reached. In this position shown in FIG. 5.5, the flowable medium exerts the necessary afterpressure on the molded article in the injection mold, so that the mold cavity is filled in an optimum manner and the molded article receives its optimum shape.

By rotating the closing needle 106 into the position 106 shown in FIG. 5.6, the closing needle 106 is again returned into the position of operation shown in FIG. 5.1.

The positions of operation of the extruder head 102 illustrated in FIGS. 5.2 and 5.5 of the drawing are not only used for supplying the pressurized flowable medium into the mold cavity of the injection mold. Rather, it is also possible to use these positions of the needle 106 for releasing the pressure from the hollow molded article prior to opening of the injection mold.

The extruder head shown in FIGS. 6.1 to 6.5 is used for manufacturing hollow molded articles which are made from two different plastics material components.

The extruder head 201 has a nozzle 202 which can be placed against a sprue bushing 203 of an injection mold, not shown.

A duct 205 is formed in housing 204 of extruder head 201. Duct 205 extends coaxially with nozzle 202. A tubular insert 207 is received in and forms an annular gap 206 with the duct 205. Insert 207 is axially displaceable within certain limits. A needle 209 is mounted in tubular insert 207 closely adjacent to the inner circumference 208 of the insert 207. The needle 209 is also axially displaceable within certain limits. The tubular insert 207 as well as the needle 209 are each provided with a shaft, not shown, which extends toward the rear through the extruder head 201. A displacement drive, operated for example by a pressure medium, particularly hydraulically, acts on each of the shafts.

The forward end of the tubular insert 207 has a sealing cone 210 which cooperates with a correspondingly shaped sealing cone 11 in the nozzle 202 when the tubular insert 207 is in the forward sealing position as shown in FIGS. 6.1. In this position, no connection exists between the orifice 212 of the nozzle 202 and the annular gap 206. When the tubular insert tool 7 is axially retracted by means of its displacement drive, the sealing cone 210 is moved away from the sealing cone 211 and, thus, the annular gap 206 is connected to the orifice 212, as shown in FIG. 2, so that the thermoplastic material in the annular gap 206 can reach the injection mold.

The needle 209 also has a sealing cone 213, in which, in the forward position of the needle 209, rests against a corresponding sealing cone 214 of the tubular insert tool 207, so that the space formed by the inner circumference 208 is blocked from the central orifice 215.

An opening 216 of a supply duct 217 for a second thermoplastic material is provided at the inner circumference 208 of the tubular insert tool 7 near the sealing cone 214, as can be seen in FIGS. 6.1 to 6.5. Supply duct 217 extends in longitudinal direction through the wall of the tubular insert tool 7 and is at its rearward end in communication with an extruding unit for the respective thermoplastic material. Of course, a corresponding extruding unit for thermoplastic material is also connected to the annular gap 206 between the housing 204 and the tubular insert 207. In accordance with another important feature, needle 209 has at its free end a reduced diameter projection 218 which, in the forwardly moved position of the needle 209, extends into the orifice 215 of the tubular insert 207 and fills out the latter over the entire length thereof.

It is particularly advantageous if, in the forwardly moved position of the needle 209, the projection 218 projects with its forward end slightly out of the orifice 215 and is provided at its forward end with a bevel which forms the continuation of the sealing cone 210 of the tubular insert 209, thus, slightly projects into the orifice 212 of the nozzle 202.

Needle 209 has at the free end of the projection 218 a central orifice 220 to which is connected toward the rear a connecting duct 221 which, in turn, has a radial opening 222.

The radial opening 222 of the connecting duct 221 may be connected to a radial opening 223 of a longitudinally extending connecting duct 224 formed at the inner circumference 208 of the tubular insert 207. As the supply duct 217, the connecting duct 224 also is provided in the wall of the tubular insert 207, preferably in a cross-sectional area diametrically opposite to supply duct 217. The opening 223 of the connecting duct 224 has a greater distance from the sealing cone 214 than the radial opening 216 of the supply duct 217.

It should be mentioned at this point that the needle 209 is not only axially displaceable within the tubular insert 207, but is also rotatable therein at least over a limited angle of rotation. For this purpose, the needle 209 is coupled to a rotary drive, not shown, operated, for example, by a pressure medium, particularly hydraulically. In this manner, it is possible optionally to connect or disconnect the radial opening 222 of the connecting duct 221 of the needle 209 and the opening 223 of the connecting duct 224 in the tubular insert 207.

In the embodiment of the extruder head 201 shown in FIGS. 6.1 to 6.4 of the drawing, the radial opening 222 of the connecting duct 221 as well as the opening 223 of the connecting duct 224 are shaped in such a way that a flow connection can only be obtained when the needle 209 is in the fully forwardly moved position. In the embodiment shown in FIG. 6.5, on the other hand, the radial opening 222 is shaped in such a way that such a flow connection is possible in any axial position of the needle 209 relative to tubular insert 207.

As soon as the opening 222 of the connecting duct 221 has been placed in alignment with the opening 223 of the connecting duct 224, a flowable medium, particularly a pressure gas, can be supplied through the connecting duct 224 in the tubular insert 207 and the connecting duct 221 in the needle 209 to the central orifice 220 of the extruder head 201. In this case, the connecting duct 224 is connected to a control and regulating system as it is shown in FIGS. 1 to 3 of the drawing.

The flowable medium, particularly gas, can be conducted under a relatively high pressure into the injection mold through the central orifice 220 after plastics material has initially been introduced into the injection mold from the annular gap 206 and plastics material has then been pressed from the tubular insert 207 into the injection mold, as schematically indicated in FIGS. 6.2 and 6.3.

In the embodiment of the extruder head 201 shown in FIGS. 6.1 and 6.4, the central orifice 220 in the needle 209 permits supply of medium into the injection mold only when the inner orifice is surrounded by the tubular insert 207 has also been placed into the closing position, as shown in FIG. 6.4. In the embodiment shown in FIG. 6.5, the radial opening 222 of the connecting duct 221 in the needle 209 has an axial width which makes it possible to connect and disconnect the opening 222 with the radial opening of the connecting duct 224 in the tubular insert 207 when the inner orifice is in the closed position as well as in the open position. For this purpose, it is only necessary to rotate the needle 209 by a certain angle relative to the tubular insert 207.

The extruder heads illustrated in FIGS. 5.1 to 5.6 and 6.1 to 6.5 make it possible to manufacture by injection molding high-quality hollow molded articles of thermoplastic materials because the necessary supply and discharge of the flowable medium which can be variably pressurized can be effected directly by means of the extruder head, wherein the extruder head also ensures the proportioned introduction of the thermoplastic material melt into the mold cavity of the injection mold. The variation of the pressure level of the flowable medium, particularly the pressurized gas, is possible, independently of the use of the extruder heads 101 or 201 shown in FIGS. 5.1 to 5.6 and 6.1 to 6.5, solely by means of one of the control and regulating systems as they are shown in FIGS. 1 to 4 and as they are described in detail above.

While specific embodiments of the invention have been shown and described in detail to illustrate the application of the inventive principles, it will be understood that the invention may be embodied otherwise without departing from such principles.

We claim:

1. In a method of injection molding an article of thermoplastic material, the method including initially forcing molten thermoplastic material into a mold cavity of an injection mold in an amount sufficient for forming the article, the mold cavity having a surface, subsequently forcing a single flowable medium into the injection mold and thermoplastic material with a pressure which distributes the thermoplastic material uniformly over the surface of the mold cavity so as to form a hollow body, such that the thermoplastic material defines a surface, cooling the hollow body in the injection mold while maintaining the pressure of the medium therein, and releasing the pressure of the medium from the hollow body and removing the molded article from the injection mold, the improvement comprising conducting the flowable medium from a pressure reservoir into the mold cavity and to the surface of the thermoplastic material distributed over the surface of the mold cavity, preventing the flowable medium from flowing back out of the mold cavity and controlling the pressure of the medium existing within the injection mold and acting on the surface of the thermoplastic material distributed over the surface of the mold cavity at least temporarily until the thermoplastic material has cooled wherein the pressure of the medium is controlled from a lowest pressure level to a highest pressure level and then to a middle pressure level before the pressure of the medium is released from the hollow body.

2. The method according to claim 1, wherein the flowable medium is a gas.

3. The method according to claim 1, wherein the pressure of the medium is controlled in accordance with a pattern which is predetermined for the molded article.

4. The method according to claim 1, wherein the pressure of the medium is controlled in accordance with a pattern which is predetermined for the thermoplastic material.

5. The method according to claim 3 or 4, wherein the control of the pressure of the medium is effected over a predetermined period of time.

6. The method according to claim 3 or 4, wherein the control of the pressure of the medium is distance-dependent in dependence upon the travel distance of the injection means.

7. The method according to claims 3 or 4, wherein the control of the pressure of the medium is time-dependent and distance-dependent.

8. The method according to claims 3 or 4, wherein the control of the pressure of the medium is effected over a predetermined period of time and is in dependence upon the temperature of the thermoplastic material.

9. The method according to claim 8, wherein the regulation of the pressure of the medium is in dependence upon the temperature of the thermoplastic material in the mold cavity of the injection mold.

10. The method according to claims 3 or 4, the mold cavity having an interior pressure, wherein the control of the pressure of the medium is in dependence upon the interior pressure in the mold cavity.

11. The method according to claim 1, wherein the pressure of the medium is regulated and/or controlled so as to increase and decrease gradually.

12. The method according to claim 1, wherein the pressure of the medium is changed suddenly.

* * * * *

REEXAMINATION CERTIFICATE (3610th)
United States Patent [19]
Eckardt et al.

[11] B1 5,047,183
[45] Certificate Issued Aug. 25, 1998

[54] METHOD OF INJECTION MOLDING ARTICLES OF THERMOPLASTIC MATERIALS

[75] Inventors: Helmut Eckardt, Meinerzhagen; Jürgen Ehritt, Hilchenbach-Müsen, both of Germany

[73] Assignee: Battenfeld GmbH, Meinerzhagen, Germany

Reexamination Requests:
No. 90/004,706, Jun. 27, 1997
No. 90/004,857, Dec. 4, 1997

Reexamination Certificate for:
Patent No.: 5,047,183
Issued: Sep. 10, 1991
Appl. No.: 255,715
Filed: Oct. 7, 1988

[30] Foreign Application Priority Data

Oct. 9, 1987 [DE] Germany ................. 3734164

[51] Int. Cl.$^6$ ............. B29C 45/76; B29D 22/00
[52] U.S. Cl. ........... 264/40.3; 264/328.8; 264/328.12; 264/328.13; 264/572
[58] Field of Search ............ 264/40.3, 328.8, 264/328.12, 328.13, 572

[56] References Cited

U.S. PATENT DOCUMENTS

| | | | |
|---|---|---|---|
| 4,101,617 | 7/1978 | Friederich | 264/572 |
| 4,824,732 | 4/1989 | Hendry et al. | 264/572 X |

*Primary Examiner*—Leo B. Tentoni

[57] ABSTRACT

A method and an apparatus of injection molding articles of thermoplastic material. The method includes initially forcing molten plastics material into an injection mold in an amount sufficient for forming the article. Subsequently, a flowable medium is forced into the injection mold with a pressure which distributes the plastics material uniformly over the surface of the mold cavity of the injection mold so as to form a hollow body. The hollow body is then cooled while the pressure of the medium is maintained. Finaly, the pressure of the medium is released and the molded article is removed from the injection mold. The pressure of the medium in the mold cavity is controlled and/or varied at least temporarily until the plastics material has cooled. The apparatus for carrying out the method includes a pressure reservoir for the medium which is connectible to the injection mold through lines. The lines include control and/or regulating elements.

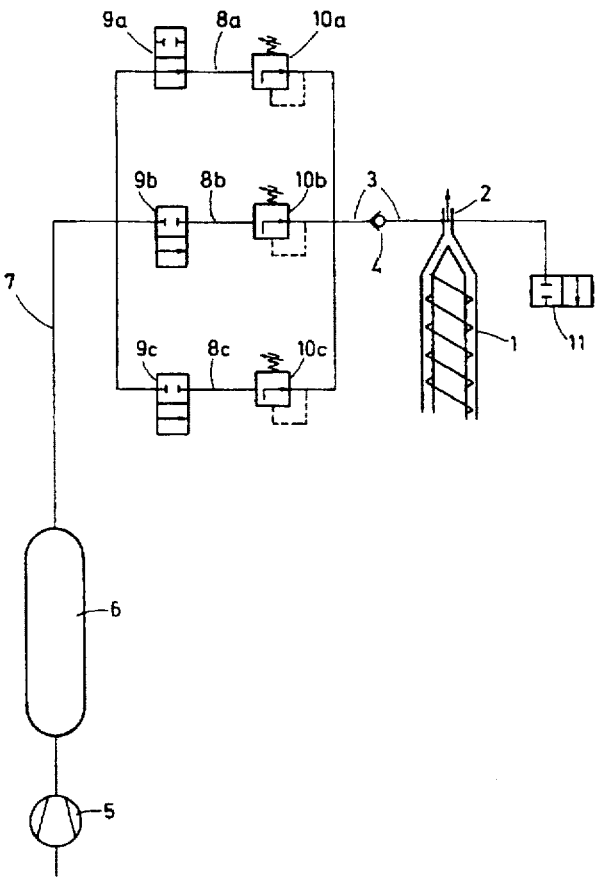

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2–12, dependent on an amended claim, are determined to be patentable.

1. In a method of injection molding an article of thermoplastic material, the method including initially forcing molten thermoplastic material into a mold cavity of an injection mold in an amount sufficient for forming the article, the mold cavity having a surface, subsequently forcing a single flowable medium into the injection mold and thermoplastic material with a pressure which distributes the thermoplastic material uniformly over the surface of the mold cavity so as to form a hollow body, such that the thermoplastic material defines a surface, cooling the hollow body in the injection mold while maintaining the pressure of the medium therein, and releasing the pressure of the medium from the hollow body and removing the molded article from the injection mold, the improvement comprising conducting the flowable medium from a pressure reservoir into the mold cavity and to the surface of the thermoplastic material distributed over the surface of the mold cavity, preventing the flowable medium from flowing back out of the mold cavity and controlling the pressure of the medium existing within the injection mold and acting on the surface of the thermoplastic material distributed over the surface of the mold cavity at least temporarily until the thermoplastic material has cooled, wherein the [pressure of the medium is controlled from a lowest pressure level to a highest pressure level and then to a middle pressure level before the pressure of the medium is released from the hollow body] *controlling of the pressure of the medium includes introducing into the mold cavity the medium having the lowest pressure level for distributing the thermoplastic material uniformly over the surface of the mold cavity, maintaining an existing pressure level of the medium in the mold cavity after delivery of the medium having the lowest pressure level has been stopped, increasing the existing pressure in the mold cavity to the highest pressure level, maintaining the highest pressure level of the medium in the mold cavity for a predetermined period of time, releasing into the atmosphere the highest pressure level of the medium, introducing in the mold cavity the medium having a middle pressure level, maintaining a pressure level of the medium existing in the mold cavity after delivery of the medium having the middle pressure level has been stopped and, finally, releasing the pressure of the medium.*

* * * * *